(12) United States Patent
Taylor

(10) Patent No.: US 11,280,410 B2
(45) Date of Patent: Mar. 22, 2022

(54) NON-METAL GASKET

(71) Applicant: LGC US ASSET HOLDINGS, Houston, TX (US)

(72) Inventor: Robert Taylor, Spring, TX (US)

(73) Assignee: LGC US Asset Holdings, Houston, TX (US)

(*) Notice: Subject to any disclaimer, the term of this patent is extended or adjusted under 35 U.S.C. 154(b) by 87 days.

(21) Appl. No.: 15/775,849

(22) PCT Filed: Nov. 9, 2016

(86) PCT No.: PCT/US2016/061028
§ 371 (c)(1),
(2) Date: May 14, 2018

(87) PCT Pub. No.: WO2017/083320
PCT Pub. Date: May 18, 2017

(65) Prior Publication Data
US 2018/0328491 A1  Nov. 15, 2018

Related U.S. Application Data

(60) Provisional application No. 62/254,843, filed on Nov. 13, 2015.

(51) Int. Cl.
*F16J 15/10* (2006.01)
*F16L 23/22* (2006.01)
*F16L 17/067* (2006.01)

(52) U.S. Cl.
CPC .......... *F16J 15/106* (2013.01); *F16J 15/102* (2013.01); *F16L 23/22* (2013.01); *F16L 17/067* (2013.01)

(58) Field of Classification Search
CPC ........ F16L 23/18; F16L 23/22; F16J 15/0806; F16J 15/0818; F16J 15/102; F16J 15/104; F16J 15/106; F16J 2015/0856
See application file for complete search history.

(56) References Cited

U.S. PATENT DOCUMENTS 126,624 A * 5/1872 Coffee .................. F16J 15/106
                                                    277/649
2,774,621 A * 12/1956 Kilbourne, Jr. ......... F16L 23/22
                                                    277/649
(Continued)

FOREIGN PATENT DOCUMENTS

FR         2147670 A5 *  3/1973  ............. F16L 49/04
KR    1020130067176 A    6/2013

OTHER PUBLICATIONS

International Search Report and Written Opinion dated Feb. 10, 2017; International Application No. PCT/US2016/061028 filed on Nov. 9, 2016; ISA/KR.

*Primary Examiner* — Nicholas L Foster
(74) *Attorney, Agent, or Firm* — David G. Henry, Sr.; Alexander B. Uber

(57) ABSTRACT

An annular gasket for use between facing flanges of two flow conduit sections, the gasket including an annular gasket substrate made of polytetrafluoroethylene and having a first face opposite a second face. The first face includes a plurality of first serrations wherein the plurality of first serrations includes a plurality of first grooves and a plurality of first peaks, and the second face includes a plurality of second serrations wherein the plurality of second serrations includes a plurality of second grooves and a plurality of second peaks. The plurality of first peaks is aligned with the plurality of second peaks. The plurality of first peaks and the plurality of second peaks are compressible to a substantially flat surface when the conduit sections are joined together in a bolted configuration. An outer guide ring may be positioned exteriorly to the annular gasket substrate.

12 Claims, 8 Drawing Sheets

(56) References Cited

U.S. PATENT DOCUMENTS

| | | | | |
|---|---|---|---|---|
| 3,836,183 | A * | 9/1974 | Battle | F16J 15/106 |
| | | | | 285/363 |
| 8,852,486 | B2 * | 10/2014 | Tanner | F16J 15/102 |
| | | | | 264/322 |
| D732,149 | S * | 6/2015 | Young | F16L 23/18 |
| | | | | D23/269 |
| 9,285,062 | B2 * | 3/2016 | Jenkins | F16L 23/18 |
| 9,701,058 | B2 * | 7/2017 | Valle | B29D 99/0085 |
| 2003/0080518 | A1 | 5/2003 | Burton et al. | |
| 2004/0090016 | A1 * | 5/2004 | Sharp | F16J 15/0881 |
| | | | | 277/603 |
| 2004/0118510 | A1 | 6/2004 | Pollock et al. | |
| 2005/0116427 | A1 | 6/2005 | Seidel et al. | |
| 2005/0121859 | A1 | 6/2005 | Seidel et al. | |
| 2005/0280214 | A1 * | 12/2005 | Richards | F16J 15/122 |
| | | | | 277/608 |
| 2009/0115139 | A1 * | 5/2009 | Jenkins | F16L 23/167 |
| | | | | 277/610 |
| 2013/0249171 | A1 * | 9/2013 | Kolb | F16J 15/0818 |
| | | | | 277/608 |
| 2013/0341874 | A1 * | 12/2013 | Aykanat | F16L 23/18 |
| | | | | 277/612 |
| 2015/0316150 | A1 * | 11/2015 | Zhao | F16J 15/0887 |
| | | | | 277/648 |
| 2017/0080631 | A1 * | 3/2017 | Valle | B29D 99/0085 |
| 2017/0276249 | A1 * | 9/2017 | Kolb | F16L 23/20 |
| 2018/0058616 | A1 * | 3/2018 | Rowley | B29C 70/74 |

* cited by examiner

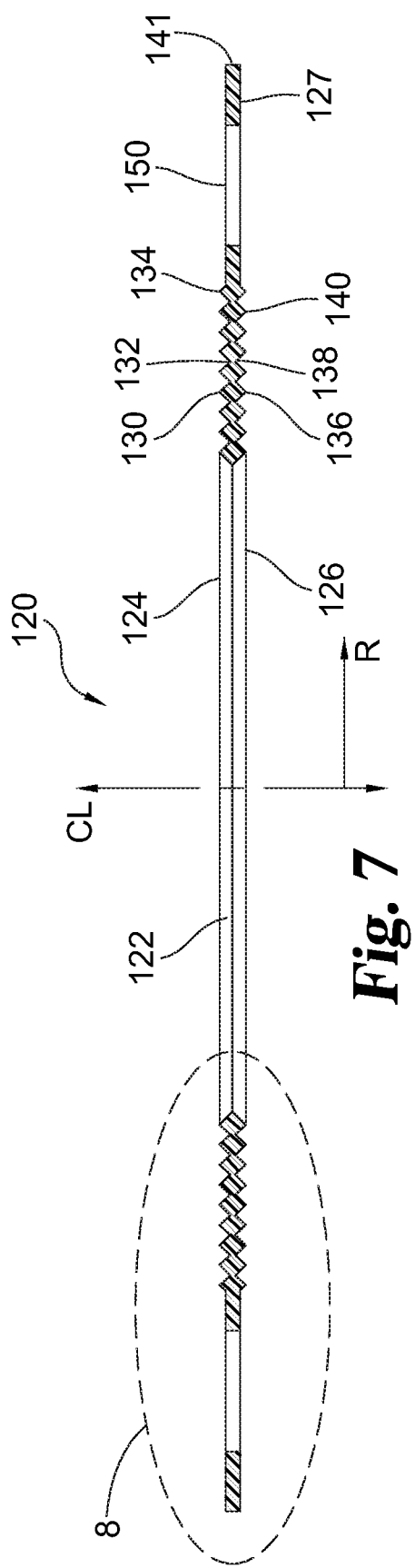
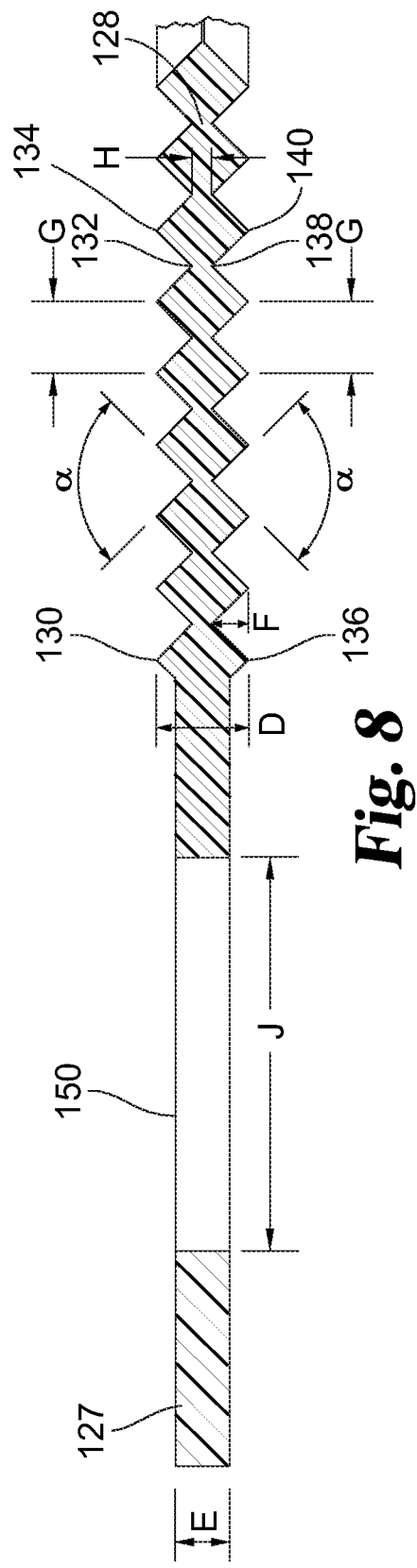

NON-METAL GASKET

CROSS-REFERENCE TO RELATED APPLICATION

This application is a 35 U.S.C. 371 national stage filing of PCT Application No. PCT/US2016/061028 filed on Nov. 9, 2016, entitled "NON-METAL GASKET," which claims priority to U.S. Provisional Patent Application No. 62/254,843, filed on Nov. 13, 2015, each of which are incorporated herein in their entirety by reference.

BACKGROUND

The present invention relates generally to gaskets and, more particularly, to an improved non-metal gasket for positioning between facing conduit flanges. These facing flanges are bolted together, and some of the bolted joint characteristics are relevant to the type of gasket which is selected.

In terms of technological background, one general style of flange gasket is best described as a formed polytetrafluoroethylene (PTFE) gasket with a particular thickness and having a pair of smooth or flat outer sealing surfaces that are designed for a low or limited amount of load to be applied to the formed PTFE gasket when sealing the PTFE gasket between facing flanges of pipes. A formed PTFE gasket is often used for chemical compatibility and chemical resistance to the fluid that flows through the connecting pipes. PTFE is highly resistant to chemicals, solvents, caustics, and acids. PTFE has a very low surface energy and does not adhere to the flanges. A formed PTFE gasket is often designed to create a seal at a low gasket stress, which is ideal for plastic, fiberglass, and glass-lined flanges. However, the low amount of gasket stress often corresponds to an unacceptably high amount of fluid leakage or leak rate from the facing flanges.

A kammprofile metal gasket has small grooves and ridges on outer sealing surfaces and is typically used for heat exchangers, large vessels, and other equipment that experience excessive movement due to thermal expansion. Kammprofile metal gaskets do not allow for any noticeable deflection in the core and therefore do not contribute to compressibility. The ability for this style of gasket to compensate for flange misalignment and issues with flange face parallelism are essentially nonexistent. Moreover, a metal gasket is often not chemically resistant to chemicals, solvents, caustics, and acids.

Thus, there is a need for improvement in this field.

SUMMARY

Aspect 1 concerns an annular non-metal gasket for use between facing flanges of two flow conduit sections, each flow conduit section defining a through bore, the gasket comprising an annular gasket substrate made of polytetrafluoroethylene (PTFE), the annular gasket substrate having a first face opposite a second face, the first face having a plurality of first serrations wherein the plurality of first serrations includes a plurality of first grooves and a plurality of first peaks, the second face having a plurality of second serrations wherein the plurality of second serrations includes a plurality of second grooves and a plurality of second peaks, wherein the plurality of first peaks are aligned with the plurality of second peaks.

Aspect 2 concerns the annular non-metal gasket of aspect 1, wherein each of the plurality of first grooves defines a sidewall angle that is between about 60 degrees to about 120 degrees.

Aspect 3 concerns the annular non-metal gasket of aspect 2, wherein all of the sidewall angles are substantially the same.

Aspect 4 concerns the annular non-metal gasket of aspect 2, wherein all of the sidewall angles are about 90 degrees.

Aspect 5 concerns the annular non-metal gasket of any of the preceding aspects, wherein the annular gasket substrate includes a sealing core, the sealing core having a thickness that spans from the plurality of first grooves to the plurality of second grooves.

Aspect 6 concerns the annular non-metal gasket of any of the preceding aspects, wherein the plurality of first peaks and the plurality of second peaks are compressible to a substantially flat configuration when a load is applied to the first face and the second face of the annular gasket substrate.

Aspect 7 concerns the annular non-metal gasket of any of the preceding aspects, further comprising an outer guide ring positioned exteriorly to the annular gasket substrate.

Aspect 8 concerns the annular non-metal gasket of aspect 7, wherein the outer guide ring is made of PTFE.

Aspect 9 concerns a method of manufacturing a non-metal gasket, comprising providing an annular gasket blank made of polytetrafluoroethylene (PTFE), the annular gasket blank having a substantially flat first face opposite a substantially flat second face; placing the annular gasket blank in a compression mold that includes a first die and a second die, wherein the first die has an annular face with a plurality of first grooves and a plurality of first ridges, and wherein the second die has an annular face with a plurality of second grooves and a plurality of second ridges; pressing at least one of the first die or the second die towards the other of the first die or the second die to compress the annular gasket blank therebetween to form a complementary plurality of first peaks and a complementary plurality of first grooves on the first face of the gasket blank that correspond to the plurality of first grooves and the plurality of first ridges of the first die, respectively; and wherein said pressing includes to form a complementary plurality of second peaks and a complementary plurality of second grooves on the second face of the gasket blank that correspond to the plurality of second grooves and the plurality of second ridges of the second die, respectively.

Aspect 10 concerns the method of aspect 9, further comprising cutting the annular gasket blank to form an outer diameter and an inner diameter.

Aspect 11 concerns the method of aspects 9 or 10, further comprising fabricating an outer guide ring from the annular gasket blank.

Aspect 12 concerns the method of aspects 9-11, wherein the pressing at least one of the first die or the second die includes applying a force between about 5000 psi and 8000 psi.

Aspect 13 concerns the method of aspects 9-12, further comprising performing the pressing at least one of the first die or the second die at ambient temperature.

Aspect 14 concerns an annular non-metal gasket for use between facing flanges of two flow conduit sections, each flow conduit section defining a through bore, the gasket comprising an annular gasket substrate having a first face opposite a second face, the first face having a plurality of first serrations wherein the plurality of first serrations includes a plurality of first grooves and a plurality of first peaks, the plurality of first peaks being compressible when a force is applied to the first face, the second face having a plurality of second serrations wherein the plurality of second serrations includes a plurality of second grooves and a plurality of second peaks, the plurality of second peaks being compressible when a force is applied to the second face, wherein the plurality of first peaks are aligned with the plurality of second peaks.

Aspect 15 concerns the gasket of aspect 14, wherein the plurality of first peaks and the plurality of second peaks are compressed to a substantially flat configuration when the joined flow conduit sections are pressed together.

Aspect 16 concerns the gasket of aspects 14-15, wherein the annular gasket substrate includes a sealing core, the sealing core having a thickness that spans from the plurality of first grooves to the plurality of second grooves.

Aspect 17 concerns the gasket of aspect 16, wherein the thickness of the sealing core is between about 20% to about 30% of a depth of the gasket substrate measured between the plurality of first peaks and the plurality of second peaks.

Aspect 18 concerns the gasket of aspect 17, wherein the thickness of the sealing core is between about 0.03 inches to about 0.10 inches.

Aspect 19 concerns the gasket of aspects 14-18, further comprising an outer guide ring positioned exteriorly to the annular gasket substrate.

Aspect 20 concerns the gasket of aspects 14-19, wherein the outer guide ring includes at least one hole sized to receive a bolt therethrough.

Further forms, objects, features, aspects, benefits, advantages, and embodiments of the present invention will become apparent from a detailed description and drawings provided herewith.

BRIEF DESCRIPTION OF THE DRAWINGS

FIG. 7 is a cross-sectional view of the FIG. 6 non-metal gasket as viewed along line 7-7 in FIG. 6.

FIG. 8 is a partial, enlarged detail of the FIG. 6 non-metal gasket.

DESCRIPTION OF THE SELECTED EMBODIMENTS

Figure 1:
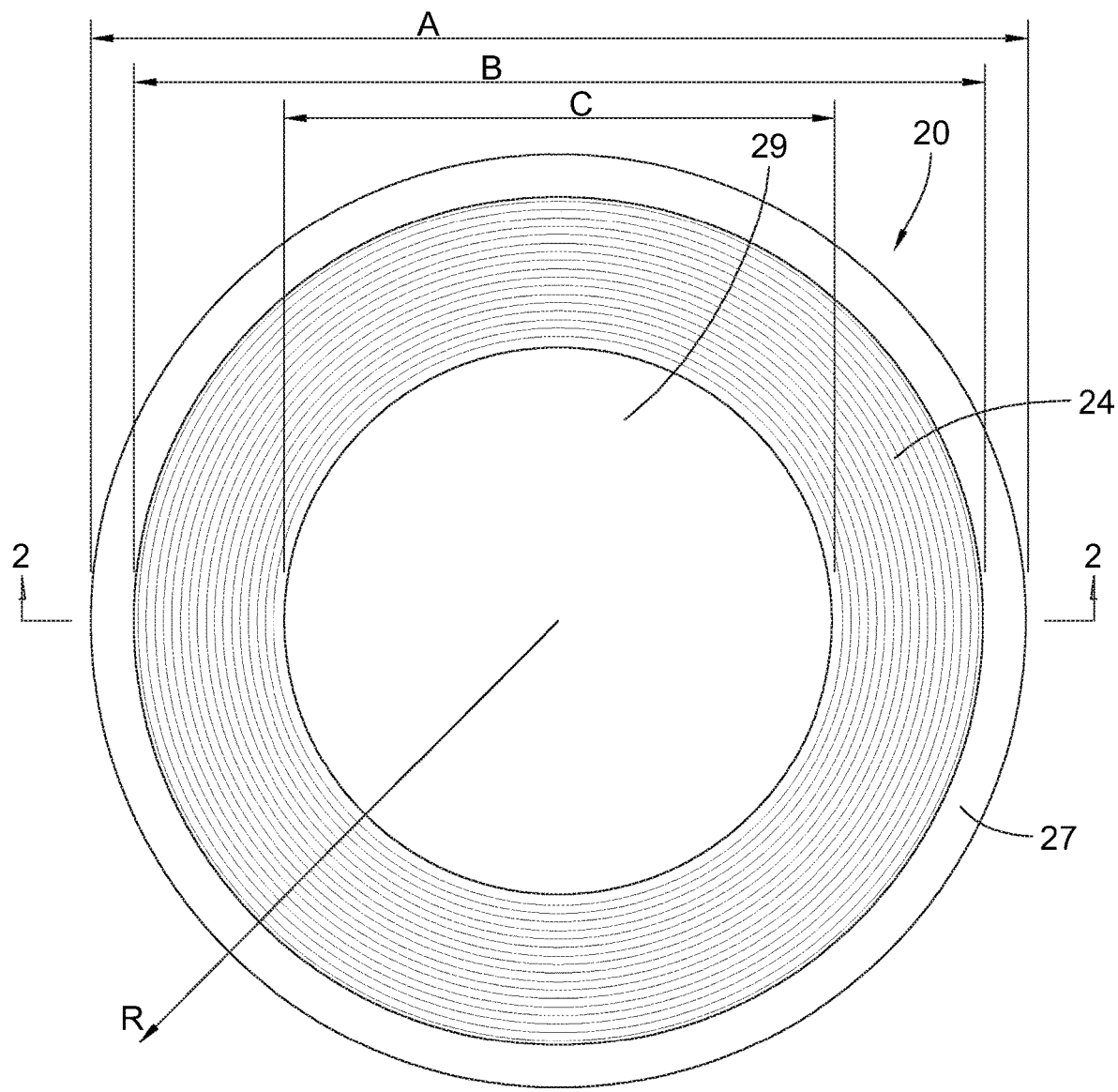
FIG. 1 is a top plan view of a non-metal gasket according to the present disclosure.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 2:
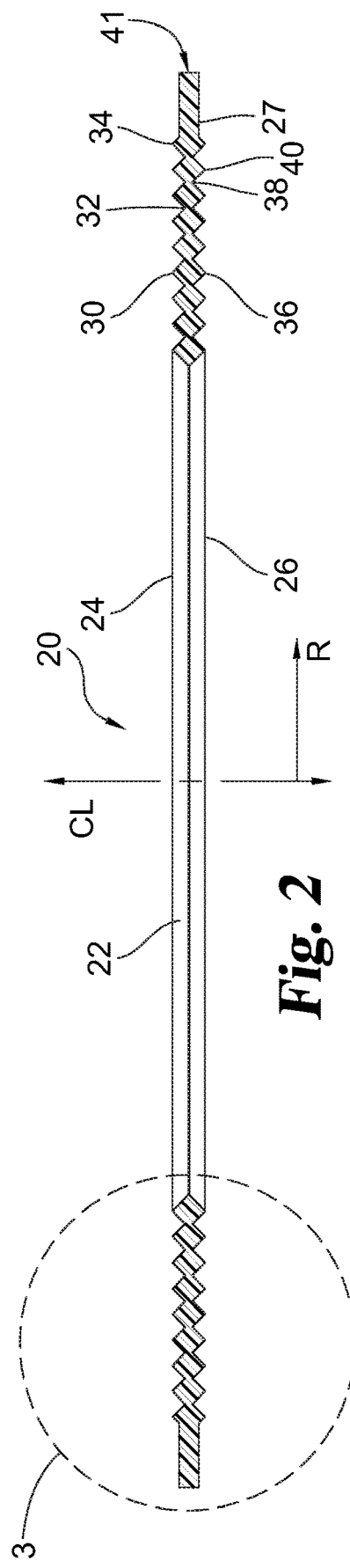
FIG. 2 is a cross-sectional view of the FIG. 1 non-metal gasket as viewed along line 2-2 in FIG. 1.
Figure 3:
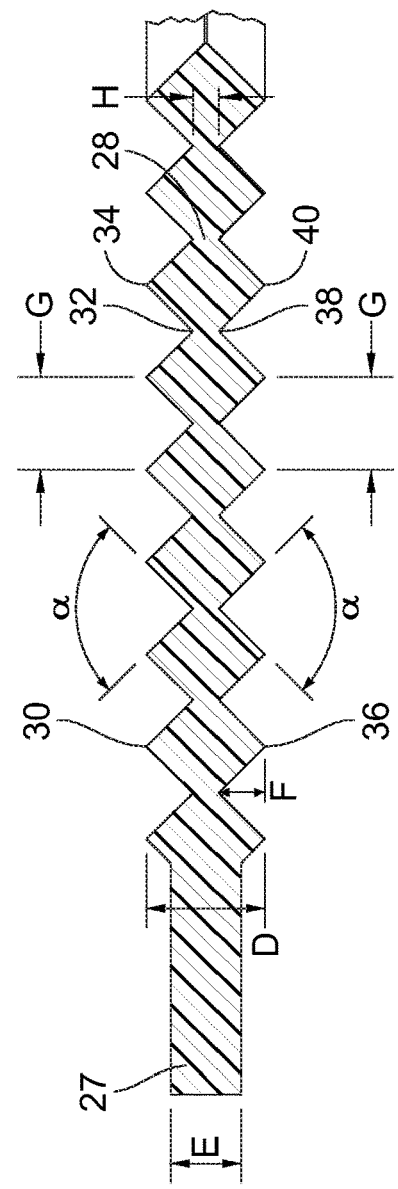
FIG. 3 is a partial, enlarged detail of the FIG. 1 non-metal gasket.
Figure 4:
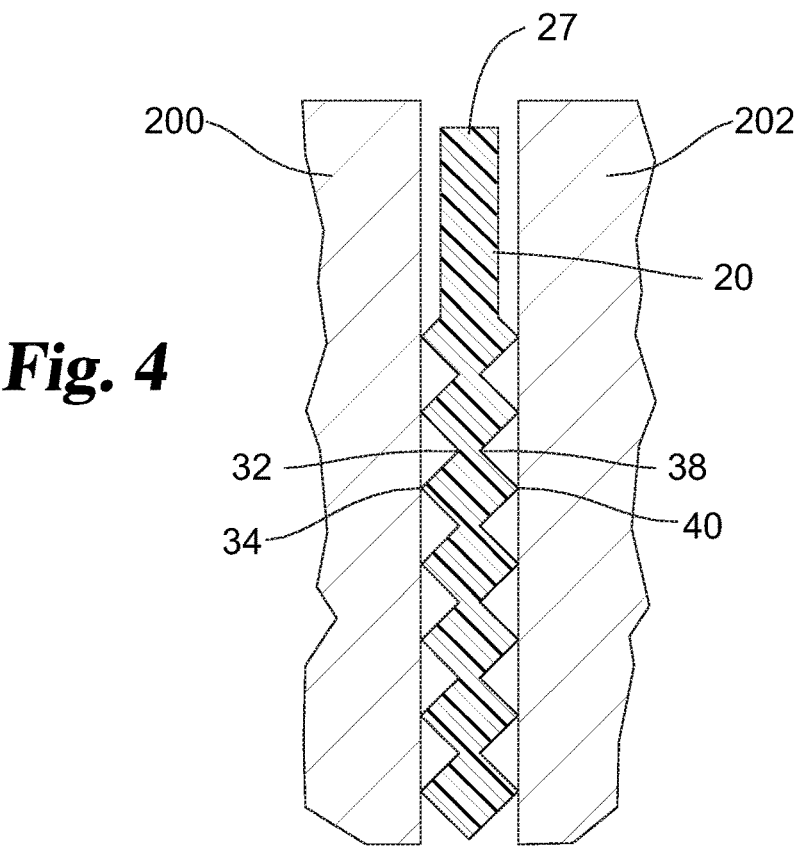
FIG. 4 is a cross-sectional view of the FIG. 1 non-metal gasket in a non-compressed configuration positioned between facing pipe flanges.
Figure 5:
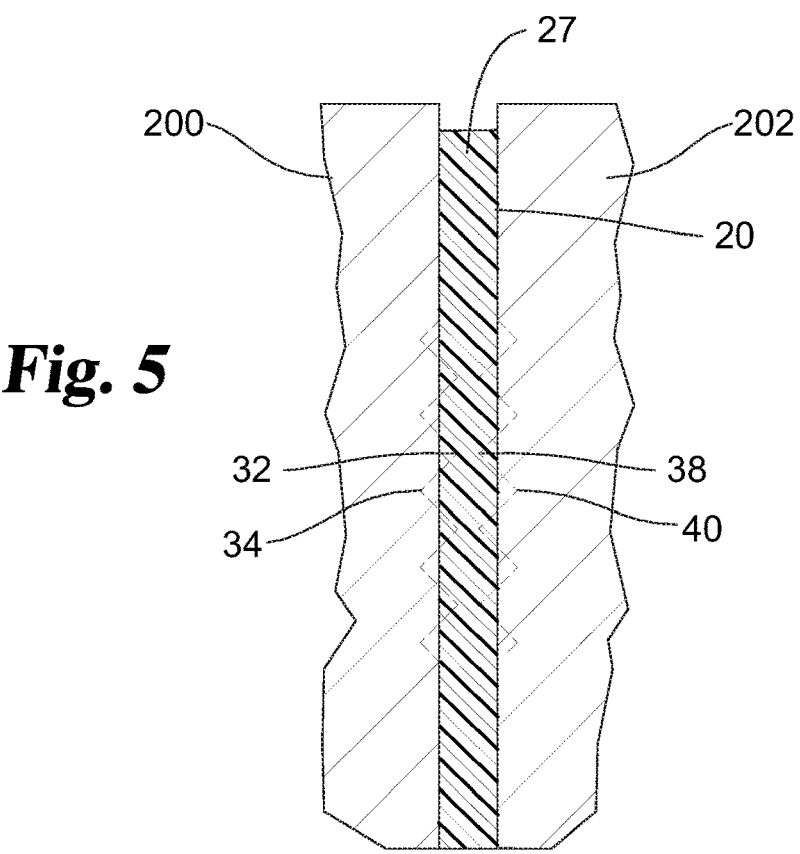
FIG. 5 is a cross-sectional view of the FIG. 1 non-metal gasket in a compressed configuration positioned between facing pipe flanges.
Figure 6:
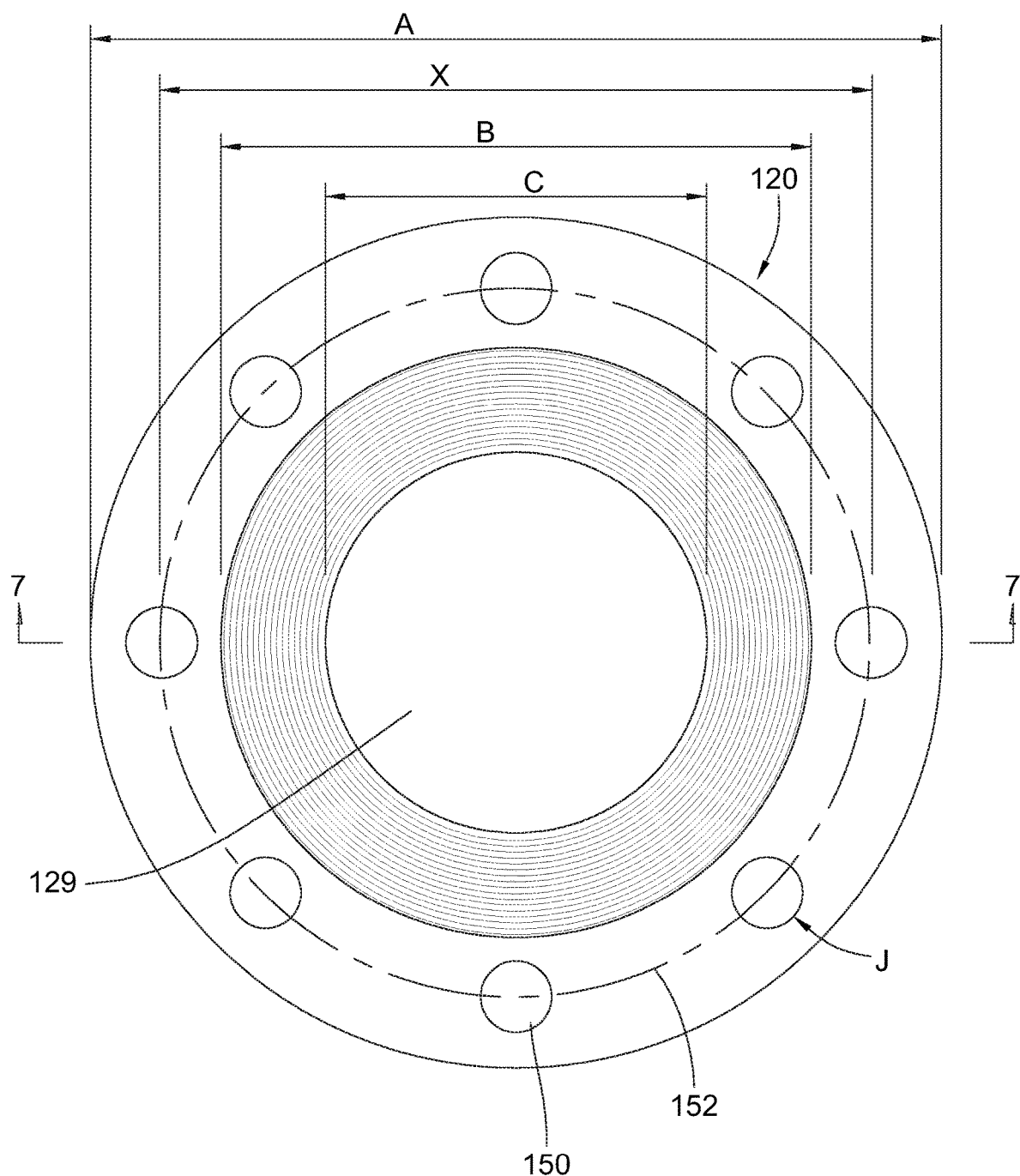
FIG. 6 is a top plan view of a non-metal gasket according to the present disclosure.

In order to help with an understanding of the exemplary embodiment, a representative non-metal gasket 20 is disclosed and illustrated in FIGS. 1, 2, 3, 4, and 5. The non-metal gasket 20 is configured for use between facing flanges of two flow conduit sections for fluid passage therethrough as illustrated in FIGS. 4 and 5. Gasket 20 is a ring type gasket and according to industry standards for this general type of gasket does not include any bolt holes. Non-metal gasket 20 can also be configured for raised face joint flanges as well as flat faced joint flanges. Referring to FIGS. 6, 7, and 8, there is illustrated a non-metal gasket 120 which does include bolt holes. Non-metal gasket 120 is constructed and arranged as a full face gasket and this is why bolt holes are provided. Gasket 120 is otherwise similar to gasket 20 in construction and function, except that the gasket 120, according to industry standards, is a full face gasket which includes bolt holes. In the exemplary embodiment, the gasket 120 includes eight bolt holes 150 which are of generally the same size and diameter, are equally spaced apart, and are centered on the same bolt circle 152. It will be understood that the bolts and bolt pattern of the flanges being joined in combination with gasket 120 determine the number, size, and spacing of bolt holes 150. With the exception of size differences and the presence of bolt holes 150 in gasket 120, gaskets 20 and 120 are structurally and functionally essentially the same, including the material choices and options.

Some types of fluid that could pass through flow conduit sections include chemicals, solvents, caustics, and acids, and many other types of fluid, that are well suited for the non-metal gaskets 20 and 120. The non-metal gaskets 20 and 120 are often used to create a seal at a low gasket stress, which is ideal for plastic, fiberglass, and glass-lined flanges of two flow conduit sections. As can be appreciated, fluid leakage of any of these fluids could be extremely dangerous and toxic. The non-metal gaskets 20 and 120 are made of polytetrafluoroethylene ("PTFE") or Teflon®, filled PTFE, biaxially-oriented PTFE, expanded PTFE ("ePTFE"), or a combination of these materials or other non-metal materials. For clarification and consistency throughout the application, axial direction shall mean the direction of fluid flow through the flow conduit and is denoted with arrow A, while radial direction shall mean the direction that is radially outwardly from an axial centerline CL of the flow conduit and is denoted with arrow R in FIGS. 1-8.

Turning now to FIGS. 1, 2, and 3, the non-metal gasket 20 includes an annular gasket substrate 22 having a first face 24 opposite a second face 26 and a sealing core 28 between the first face 24 and the second face 26. The non-metal gasket 20 includes an outer guide ring 27 positioned exteriorly to the annular gasket substrate 22. The outer guide ring 27 may be monolithic with or attached to the annular gasket substrate 22. The non-metal gasket 20 includes an opening 29 that spans between the first face 24 and the second face 26 to allow fluid passage therethrough when the non-metal gasket 20 is assembled with the fluid flow conduit sections as described in more detail below. The following details regarding annular gasket substrate 22, outer guide ring 27, sealing core 28, and opening 29 are fully applicable to an annular gasket substrate 122, an outer guide ring 127, a sealing core 128, and an opening 129 of gasket 120.

The first face 24 includes a plurality of first serrations 30 wherein the plurality of first serrations 30 includes a plurality of first grooves 32 that alternate with a plurality of first peaks 34. The second face 26 includes a plurality of second serrations 36 wherein the plurality of second serrations 36 includes a plurality of second grooves 38 that alternate with a plurality of second peaks 40. The following details regarding the first face 24, the second face 26, the plurality of first serrations 30, the plurality of first grooves 32, the plurality of first peaks 34, the plurality of second serrations 36, the plurality of second grooves 38, and the plurality of second peaks 40 are fully applicable to a first face 124, a second face 126 of gasket 120, a plurality of first serrations 130, a plurality of first grooves 132, a plurality of first peaks 134, a plurality of second serrations 136, a plurality of second grooves 138, and a plurality of second peaks 140 unless noted otherwise.

Alternatively, either the first face 24 or the second face 26 may be smooth or substantially flat and without any serrations. As illustrated, the plurality of first peaks 34 is aligned with the plurality of second peaks 40 and similarly the plurality of the first grooves 32 is aligned with the plurality of second grooves 38. The plurality of first grooves 32 and the plurality of first peaks 34 can continue to an outside face 41 of the outer guide ring 27 or the plurality of first grooves 32 and the plurality of first peaks 34 can terminate before reaching the outside face 41 to leave an outer border with a smooth, non-roughened surface profile on the outer guide ring 27. Regarding gasket 120, a plurality of first peaks 134 and a plurality of the first grooves 132 terminate before reaching an outside face 141 to leave the outer guide ring 127 having a larger radial length than the outer guide ring 27. Outer guide ring 127 includes eight bolt holes 150 that are equally spaced apart and are centered on the same bolt circle 152.

The plurality of first peaks 34 and the plurality of first grooves 32 are substantially the same as the plurality of second peaks 40 and the plurality of second grooves 38, respectively; therefore only the plurality of first peaks 34 and the plurality of first grooves 32 will be described next for brevity. The plurality of first grooves 32 and the plurality of first peaks 34 may have a different configuration including curved, corrugated, sinusoidal, rectangular, or some other polygonal shape.

Each of the plurality of first grooves 32 defines a sidewall angle α that is between about 60 degrees to about 120 degrees. All of the sidewall angles α may be substantially the same. In one particular form, all of the sidewall angles α are about 90 degrees. The plurality of first peaks 34 has a peak-to-peak distance G that is measured between two adjacent peaks as illustrated in FIG. 3. Each of the plurality of first grooves 32 has a depth F that is measured from the top or apex of the plurality of first peaks 34 to the bottom or valley of the plurality of first grooves 32. The sealing core 28 has a thickness H that spans from the bottom or valley of the plurality of first grooves 32 to the bottom or valley of the plurality of second grooves 38. The overall thickness D of the plurality of first peaks 34, the sealing core 28, and the plurality of second peaks 40 is illustrated in FIG. 3. The peak-to-peak distance G between the plurality of first peaks 34 and depth F of the plurality of first grooves 32 may vary; however, the peak-to-peak distance G of the plurality of first peaks 34 and depth F of the plurality of first grooves 32 are sufficient to receive compressive load or force such that the plurality of first peaks 34 are compressible by the compressive load or force such as when the non-metal gasket 20 is positioned between the facing pipe flanges and compressed as illustrated in FIG. 5. The thickness H of the sealing core 28 is sufficient to withstand the compressive load or force without deformation or with very little deformation. Additionally, due to the manufacturing technique to form the gasket 20, the sealing core 28 may be a denser material than the plurality of first peaks 34 that enables the sealing core 28 to withstand the compressive load or force without deformation whereas the plurality of first peaks 34 being more compressible will deform when a compressive load or force is applied. The outer guide ring 27 has a thickness E that is less than the overall thickness D.

Letters are used to represent the various dimensions and sizes for various embodiments of the non-metal gasket 20. One suitable and compatible dimensional combination is set forth in Table I, as one example, for non-metal gaskets 20 and 120. Other dimensions and sizes for gaskets 20 and 120 are within the scope of this application but not listed in Table I.

TABLE I

| 4" #150/300 RING GASKET AND FULL FACE GASKET | | | | | | | | | |
|---|---|---|---|---|---|---|---|---|---|
| A | B | C | D | E | F | G | H | J | X |
| 6.8750 | 6.2500 | 4.0300 | 0.1590 | 0.0940 | 0.0630 | 0.1250 | 0.0340 | | |
| 9.0000 | 6.2500 | 4.0300 | 0.1590 | 0.0940 | 0.0630 | 0.1250 | 0.0340 | 0.7500 | 7.500 |

The thickness H of the sealing core 28 is between about 20% to about 30% of the overall thickness D of the annular gasket substrate 22 measured between the plurality of first peaks 34 and the plurality of second peaks 40. The thickness H of the sealing core 28 may be between about 0.03 inches to about 0.10 inches.

Through research and testing it was found that the configuration of the plurality of first peaks 34, the plurality of first grooves 32, the plurality of second peaks 40, the plurality of second grooves 38, the sidewall angles α, and the thickness H of the sealing core 28 provide better sealing properties than other configurations. Specifically the overall thickness D, the peak-to-peak distance G, depth F of the plurality of first and second grooves 32 and 38, and the sidewall angles α provide better sealing properties as compared to either a flat gasket made of PTFE or other configurations of corrugated gaskets.

Turning now to FIG. 4, the non-metal gasket 20 in a non-compressed configuration is positioned between a first flow conduit flange 200 and a second flow conduit flange 202 such that the opening 29 is aligned with the through bores of the first and the second flow conduit flanges 200 and 202 to be joined. The plurality of first peaks 34 contact the first flow conduit flange 200 and the plurality of second peaks 40 contact the second flow conduit flange 202.

In a compressed configuration wherein the non-metal gasket 20 is compressed between the first flow conduit flange 200 and the second flow conduit flange 202, illustrated in FIG. 5, the plurality of first peaks 34 and the plurality of second peaks 40 compress into or mold into the plurality of first grooves 32 and the plurality of second grooves 38, respectively, in a uniform, non-uniform, variable, or some other manner such that all or a portion of the plurality of first grooves 32 and the plurality of second grooves 38 are filled with the plurality of first peaks 34 and the plurality of second peaks 40, respectively. The non-compressed configuration of the gasket 20 is illustrated as dashed lines in FIG. 5. The plurality of first peaks 34 and the plurality of second peaks 40 are compressible to a substantially flat configuration when a load is applied to the first face 24 and the second face 26 or the first face 24 and the second face 26 are pressed together. The plurality of first peaks 34 and the plurality of second peaks 40 have compressibility between about 35% and about 70% as measured by ASTM F36 Method J by the America Society for Testing and Materials. As such, the sealing core 28 that is between the valleys of the plurality of first grooves 32 and the plurality of second grooves 38 has material that will be denser than at the plurality of first peaks 34 and the plurality of second peaks 40 of gasket 20. The sealing core 28 that is positioned between the valleys of the plurality of first grooves 32 and the plurality of second grooves 38 is denser so when a compressive load is applied to the first face 24 and the second face 26, the plurality of first peaks 34 and the plurality of second peaks 40 will compress before the sealing core 28 that is positioned between the valleys of the pluralities of the first and the second grooves 32 and 38, respectively. The compression applied to the sealing core 28 that is between the valleys of the plurality of first grooves 32 and the plurality of second grooves 38 will be reduced. When the gasket 20 is placed between the first flow conduit flange 200 and the second flow conduit flange 202 and load is applied, the plurality of first peaks 34 and the plurality of second peaks 40 will be compressed into or molded into the plurality of first grooves 32 and the plurality of second grooves 38, respectively. The plurality of first peaks 34 and the plurality of second peaks 40 are now flattened and form a denser region to substantially equal or match the sealing core 28 that is between the valleys of the plurality of first grooves 32 and the plurality of second grooves 38. The gasket 20 in a compressed configuration has an equal density throughout when the load applied is enough to flatten the plurality of first peaks 34 and the plurality of second peaks 40.

Figure 9:
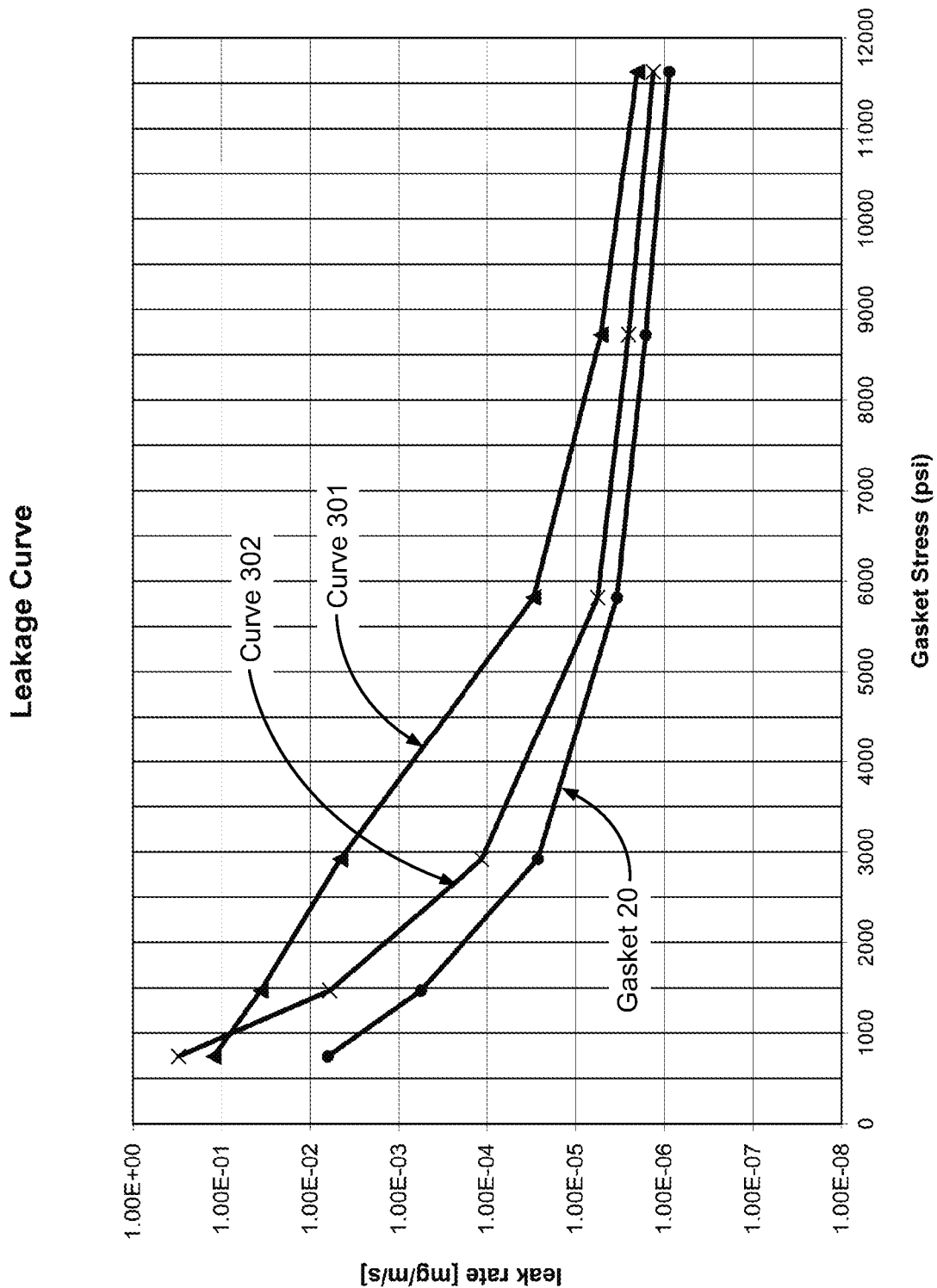
FIG. 9 is a graph showing gasket comparisons with gasket stress and leak rate defining the axes.
Figure 10:
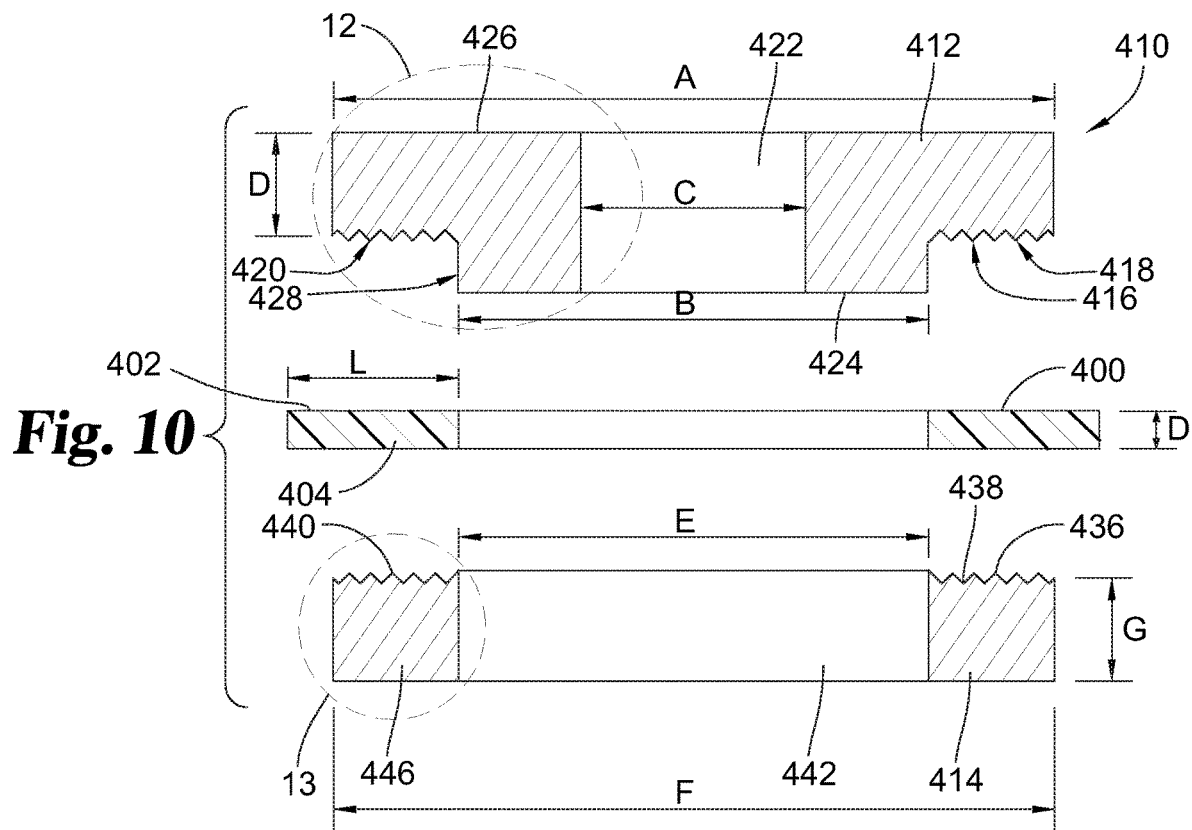
FIG. 10 is a cross-sectional view of a compression mold for manufacturing the non-metal gasket according to the present disclosure with an unformed gasket substrate positioned in the compression mold.
Figure 11:
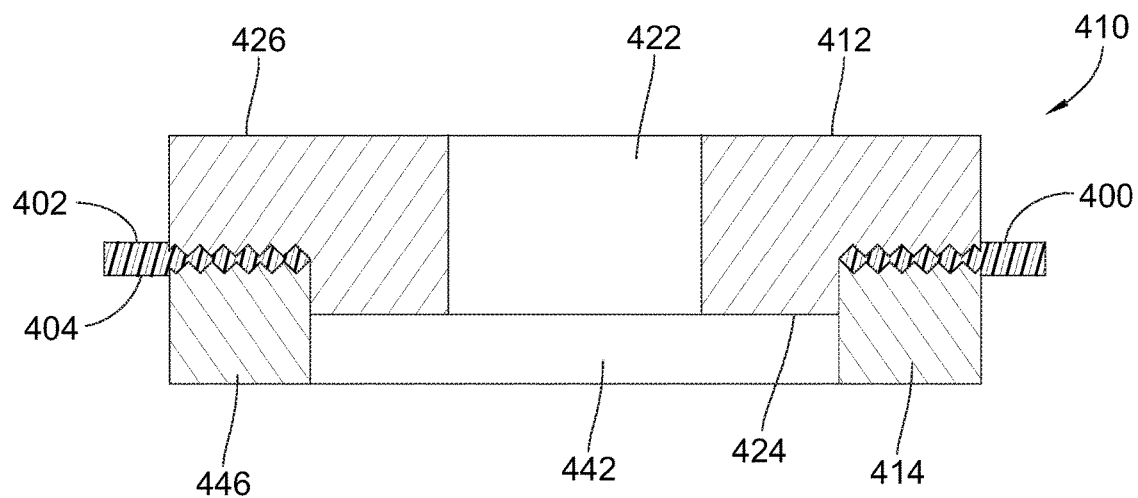
FIG. 11 is a cross-sectional view of the compression mold of FIG. 10 with a non-metal gasket formed in the compression mold.

The applicant has tested the gasket 20 and found that the gasket 20 results in a better seal between flow conduit flange faces and provides for a much better seal when at a low gasket stress, which is ideal for plastic, fiberglass, or glass-lined flanges in which a limited or low amount of load can be applied to the gasket. All of the gaskets were tested at 10 Bar (He) and 20 degrees Celsius and the test results are illustrated in FIG. 9. The applicant tested gasket 20 made of PTFE having an overall thickness D of about 0.125 inches as measured between the plurality of first peaks 34 and the plurality of second peaks 40. The test results for a 0.125 inches thick gasket made of PTFE wherein the outer faces of the gasket are flat or smooth are labeled Curves 301 and 302. The Leak Rate measures the amount of gas escaping through the gasket as the load is applied to flat plates to compress the gasket positioned between the flat plates. The Gasket Stress is the amount of clamping load applied to the gasket positioned between the flat plates. The gasket 20 leaked less than the 0.125 inches thick gasket made of PTFE designated as Curves 301 and 302. It is expected that gasket 120 would perform substantially the same as gasket 20 under similar testing conditions to provide similar test results.

In order to help with an understanding of the exemplary embodiment, a representative method or technique of manufacturing the gasket 20 is illustrated in FIGS. 10, 11, 12, and 13.

An annular gasket blank 400 made of PTFE has a first face 402 opposite a second face 404 and an overall thickness D that spans between the first face 402 and the second face 404. The first face 402 and the second face 404 are substantially flat but may be configured differently such as having a tapered or curved profile. The annular gasket blank 400 is positioned in a compression mold 410 that includes a first die 412 and a second die 414 wherein the first die 412 and the second die 414 are movable towards each other to compress the annular gasket blank 400 therebetween. The gasket blank 400 has an opening 29 and a radial length L that is sufficient to engage an annular face 416 of the first die 412 and an annular face 436 of the second die 414.

Figure 12:
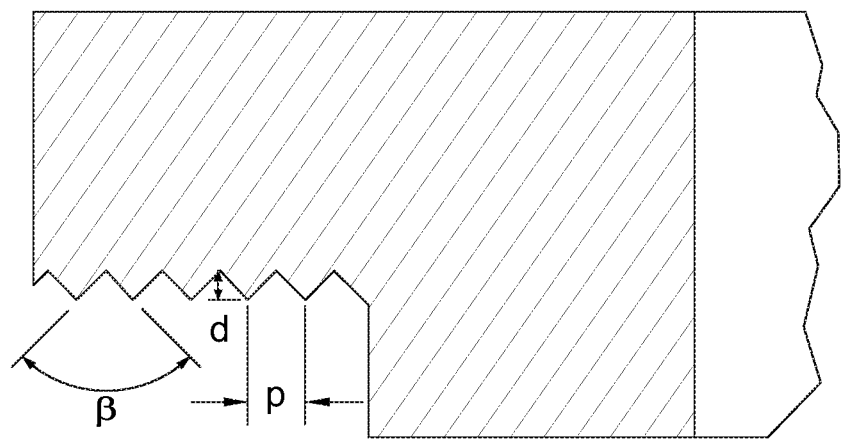
FIG. 12 is a partial, enlarged cross-sectional detail of a first die from the FIG. 10 compression mold.

The first die 412 has an annular face 416 having an alternating plurality of first grooves 418 and a plurality of first ridges 420. Each of the plurality of first grooves 418 defines a sidewall angle β that is between about 60 degrees to about 120 degrees. All of the sidewall angles β may be substantially the same. In one particular form, all of the sidewall angles β are about 90 degrees. Each of the plurality of first grooves 418 defines a depth d that corresponds to and forms the plurality of first peaks 34 of the gasket 20 as the gasket blank 400 is compressed by the first die 412. The sidewall angles β and the depth d of the plurality of first grooves 418 form the plurality of first peaks 34 of the gasket 20 and similarly the plurality of first ridges 420 correspond to the plurality of first grooves 32 of the gasket 20 when the first die 412 is pressed into the first face 402 of the gasket blank 400 to deform the material of the gasket blank 400 that is received in the plurality of first grooves 418. The plurality of first ridges 420 has a peak-to-peak distance P that is measured between two adjacent ridges as illustrated in FIG. 12. The peak-to-peak distance P of the plurality of first ridges 420 also corresponds to and forms the valleys of the plurality of first grooves 32 that are formed on the first face 402 of the gasket blank 400 as the first die 412 is pressed into the first face 402.

The first die 412 defines a first opening 422 having a diameter C that spans a length D of the first die 412. The first opening 422 extends to an inner member face 424 having a diameter B that corresponds to and is about the same size as the diameter of opening 29 of gasket 20 and gasket blank 400. The opposite end of first opening 422 extends to an outer member face 426 having a diameter A. The first die 412 also includes a wall 428 that spans between the inner member face 424 and the annular face 416. The circumference of the opening 29 of the gasket blank 400 and the circumference of the wall 428 are similarly sized such that the opening 29 will slide over the wall 428 when the first die 412 and the second die 414 are compressed together with the gasket blank 400 between the first die 412 and the second die 414.

Figure 13:
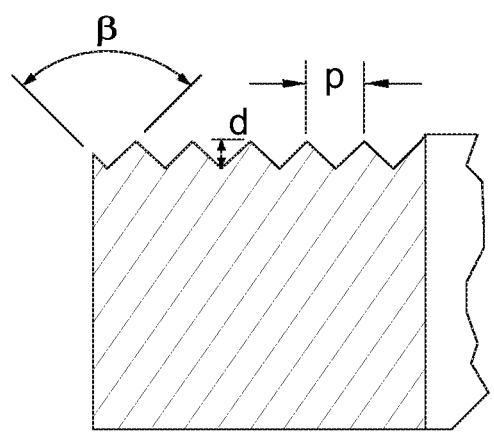
FIG. 13 is a partial, enlarged cross-sectional detail of a second die from the FIG. 10 compression mold.

The second die 414 has an annular face 436 with an alternating plurality of second grooves 438 and a plurality of second ridges 440. Each of the plurality of second grooves 438 defines a sidewall angle β that is between about 60 degrees to about 120 degrees. All of the sidewall angles β may be substantially the same. In one particular form, all of the sidewall angles β are about 90 degrees. Each of the plurality of second grooves 438 defines a depth d that corresponds to and forms the plurality of second peaks 40 of the gasket 20 as the gasket blank 400 is compressed by the second die 414. The sidewall angles β and the depth d of the plurality of second grooves 438 form the plurality of second peaks 40 of the gasket 20 and similarly the plurality of second ridges 440 correspond to the plurality of second grooves 38 of the gasket 20 when the second die 414 is pressed into the second face 404 of the gasket blank 400 to deform the material of the gasket blank 400 that is received in the plurality of second grooves 438. The plurality of second ridges 440 has a peak-to-peak distance P that is measured between two adjacent ridges as illustrated in FIG. 13. The peak-to-peak distance P of the plurality of second ridges 440 also corresponds to and forms the valleys of the plurality of second grooves 38 that are formed on the second face 404 of the gasket blank 400 as the second die 414 is pressed into the second face 404. In one form the sidewall angles β, depth d, and peak-to-peak distance P of the first die 412 and the sidewall angles β, depth d, and peak-to-peak distance P of the second die 414 are the same such that the gasket blank 400 is compressed evenly on the first face 402 and the second face 404. In an alternative form, the sidewall angles β, depth d, and peak-to-peak distance P of the first die 412 are different from the sidewall angles β, depth d, and peak-to-peak distance P of the second die 414 such that the gasket blank 400 is compressed unevenly on the first face 402 and the second face 404 thereby forming different configurations of sidewall angles β, depth d, and peak-to-peak distance P on the first face 402 as compared to the second face 404.

The second die 414 defines a second opening 442 having a diameter E that spans a length G of the second die 414. The second opening 442 extends to the annular face 436 having an inside diameter E that corresponds to and is about the same size as the diameter of opening 29 of gasket 20 and gasket blank 400. The second opening 442 has a length G. The opposite end of second opening 442 extends to an outer member face 446 having a diameter F. The opening 29 of the gasket blank 400 and the second opening 442 are similarly sized such that the opening 29 and the gasket blank 400 will slide over the wall 428 when the first die 412 and the second die 414 are compressed together with the gasket blank 400 being positioned between the first die 412 and the second die 414. In a compressed configuration, the first face 402 rests on the annular face 416 and the second face 404 rests on the annular face 436. The plurality of first grooves 418 are aligned with the plurality of second grooves 438 and correspondingly the plurality of first ridges 420 are aligned with the plurality of second ridges 440 to create or form the plurality of first serrations 30 and the plurality of second serrations 36 in the gasket 20 when the gasket blank 400 is compressed between the first and the second dies 412 and 414, respectively.

Letters are used to represent the various dimensions and sizes for various embodiments of the compression mold 410 that correspond to raised face joint flanges that range in NPS size from 0.50 inches to 12.0 inches and greater. A range of suitable and compatible dimensional combinations are set forth in Table II, as examples, for compression mold 410 to manufacture the non-metal gaskets 20 and 120. However, these dimensions are examples only, and other sizes of gaskets 20 and 120 may be manufactured as desired by a user.

TABLE II

150/300 RAISED FACE FLANGES

| NPS | A | B | C | D | E | F | G |
|---|---|---|---|---|---|---|---|
| ½" | 1.3405 | 0.6200 | 0.3750 | 0.9360 | 1.3455 | 1.3405 | 0.6445 |
| ¾" | 1.7897 | 0.8200 | 0.4100 | 0.9360 | 1.7947 | 1.7897 | 0.6445 |
| 1" | 2.0213 | 1.0500 | 0.5000 | 0.9360 | 2.0263 | 2.0213 | 0.6445 |
| 1¼" | 2.6010 | 1.3800 | 0.6250 | 0.9360 | 2.6060 | 2.6010 | 0.6445 |
| 1½" | 2.8288 | 1.6100 | 0.7500 | 0.9360 | 2.8338 | 2.8288 | 0.6445 |
| 2" | 3.5404 | 2.0700 | 1.0000 | 0.9360 | 3.5454 | 3.5404 | 0.6445 |
| 2½" | 4.1883 | 2.4700 | 1.2500 | 0.9360 | 4.1933 | 4.1883 | 0.6445 |
| 3" | 5.0410 | 3.0700 | 1.5000 | 0.9360 | 5.0460 | 5.0410 | 0.6445 |
| 3½" | 5.5200 | 3.5500 | 1.7500 | 0.9360 | 5.5250 | 5.5200 | 0.6445 |
| 4" | 6.2499 | 4.0300 | 2.0000 | 0.9360 | 6.2549 | 6.2499 | 0.6445 |
| 5" | 7.2699 | 5.0500 | 2.5000 | 0.9360 | 7.2749 | 7.2699 | 0.6445 |
| 6" | 8.5393 | 6.0700 | 3.0000 | 0.9360 | 8.5443 | 8.5393 | 0.6445 |
| 8" | 10.6977 | 7.9800 | 4.0000 | 0.9360 | 10.7027 | 10.6977 | 0.6445 |
| 10" | 12.6696 | 10.2000 | 5.0000 | 0.9360 | 12.6746 | 12.6696 | 0.6445 |
| 12" | 14.9696 | 12.0000 | 6.0000 | 0.9360 | 14.9746 | 14.9696 | 0.6445 |

To form the plurality of first serrations 30 in the gasket 20, either or both of the first die 412 and/or the second die 414 are pressed towards each other to compress the annular gasket blank 400 therebetween to form a complementary plurality of first peaks 34 and a complementary plurality of first grooves 32 on the first face 402 of the gasket blank 400 that correspond to the plurality of first grooves 418 and the plurality of first ridges 420 of the first die 412, respectively. Portions of the gasket blank 400 are deformed and compressed by the plurality of first grooves 418 and the plurality of first ridges 420 of the first die 412 to create the plurality of first serrations 30. As such, the plurality of first grooves 418 and the plurality of first ridges 420 of the first die 412 penetrate into and compress portions of the first face 402 of the gasket blank 400. The first die 412 and the second die 414 are pressed to a force between about 5000 psi and 8000 psi. Similarly, during this pressing step the plurality of second serrations 36 are formed wherein a complementary plurality of second peaks 40 and a complementary plurality of second grooves 38 on the second face 404 of the gasket blank 400 that correspond to the plurality of second grooves 438 and the plurality of second ridges 440 of the second die 414, respectively, are formed. Portions of the gasket blank 400 are deformed and compressed by the plurality of second grooves 438 and the plurality of second ridges 440 of the second die 414 to create the plurality of second serrations 36. The plurality of second grooves 438 and the plurality of second ridges 440 of the second die 412 penetrate into and compress portions of the second face 404 of the gasket blank 400. As such, the sealing core 28 that is between the valleys of the plurality of first grooves 32 and the plurality of second grooves 38 has material that will be denser than the material that forms the plurality of first peaks 34 and the plurality of second peaks 40 of gasket 20. The pressing step is performed at ambient or room temperature that is between about 15 degrees Celsius to about 30 degrees Celsius.

Either the finished gasket 20 or the gasket blank 400 may be cut to form an outer diameter and an inner diameter for opening 29. The outer guide ring 27 may be fabricated from the annular gasket blank 400 by extending a radial length L a distance beyond the outer member face 426. Alternatively, the outer guide ring 27 may be attached to the gasket blank 400.

The uses of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An annular non-metal gasket for use between facing flanges of two flow conduit sections, each flow conduit section defining a through bore, the gasket comprising:
   an annular gasket substrate substantially made of polytetrafluoroethylene (PTFE), the annular gasket substrate having a first face opposite a second face, the first face having a plurality of concentric first serrations wherein the plurality of concentric first serrations includes a plurality of first grooves and a plurality of first peaks, the second face having a plurality of concentric second serrations wherein the plurality of concentric second serrations includes a plurality of second grooves and a plurality of second peaks, wherein the plurality of first peaks are aligned with the plurality of second peaks, wherein the annular gasket substrate has a first thickness that spans from the plurality of first peaks to the plurality of second peaks, wherein the annular gasket substrate includes a sealing core, the sealing core having a core thickness that spans from the plurality of first grooves to the plurality of second grooves; and
   an outer guide portion positioned exteriorly to a primary sealing element of the annular gasket substrate, wherein the outer guide portion is configured to facilitate positioning of the annular gasket substrate, wherein the outer guide portion is axially thinner than the first thickness and axially thicker than the core thickness.

2. The annular non-metal gasket of claim 1, wherein each of the plurality of first grooves defines a sidewall angle that is between about 60 degrees to about 120 degrees.

3. The annular non-metal gasket of claim 2, wherein all of the sidewall angles are substantially the same.

4. The annular non-metal gasket of claim 2, wherein all of the sidewall angles are about 90 degrees.

5. The annular non-metal gasket of claim 1, wherein the plurality of first peaks and the plurality of second peaks are compressible to a substantially flat configuration when a load is applied to the first face and the second face of the annular gasket substrate.

6. The annular non-metal gasket of claim 1, wherein the outer guide portion is made of PTFE.

7. An annular non-metal gasket for use between facing flanges of two flow conduit sections, each flow conduit section defining a through bore, the gasket comprising:
   a monolithic non-metal annular gasket substrate having a first face opposite a second face, the first face having a plurality of concentric first serrations wherein the plurality of concentric first serrations includes a plurality of first grooves and a plurality of first peaks, the plurality of first peaks being compressible when a force is applied to the first face, the second face having a plurality of concentric second serrations wherein the plurality of concentric second serrations includes a plurality of second grooves and a plurality of second peaks, the plurality of second peaks being compressible when a force is applied to the second face, wherein the plurality of first peaks are aligned with the plurality of second peaks, wherein the annular gasket substrate has a first thickness that spans from the plurality of first peaks to the plurality of second peaks, wherein the annular gasket substrate includes a sealing core, the sealing core having a core thickness that spans from the plurality of first grooves to the plurality of second grooves; and
   an outer guide portion positioned exteriorly to a primary sealing element of the annular gasket substrate, wherein the outer guide portion is configured to facilitate positioning of the annular gasket substrate, wherein the outer guide portion is axially thinner than the first thickness and axially thicker than the core thickness.

8. The gasket of claim 7, wherein the plurality of first peaks and the plurality of second peaks are compressible to a substantially flat configuration when the joined flow conduit sections are pressed together.

9. The gasket of claim 7, wherein the thickness of the sealing core is between about 20% to about 30% of a depth of the gasket substrate measured between the plurality of first peaks and the plurality of second peaks.

10. The gasket of claim 9, wherein the core thickness is between about 0.03 inches to about 0.10 inches.

11. The gasket of claim 7, wherein the outer guide portion includes at least one hole sized to receive a bolt therethrough.

12. The gasket of claim 11, wherein the outer guide portion is annular.

* * * * *